(No Model.)

D. H. RICKARD.
DRAFT EQUALIZER.

No. 382,326. Patented May 8, 1888.

Witnesses:

Inventor:
Daniel H. Rickard,

# UNITED STATES PATENT OFFICE.

DANIEL H. RICKARD, OF WASHINGTON, DISTRICT OF COLUMBIA.

DRAFT-EQUALIZER.

SPECIFICATION forming part of Letters Patent No. 382,326, dated May 8, 1888.

Application filed October 31, 1887. Serial No. 253,847. (No model.)

*To all whom it may concern:*

Be it known that I, DANIEL H. RICKARD, a citizen of the United States, residing at Washington, in the District of Columbia, have invented certain new and useful Improvements in Draft-Equalizers; and I do hereby declare the following to be a full, clear, and exact description of the invention, such as will enable others skilled in the art to which it appertains to make and use the same.

My invention has for its object to provide an improved draft-equalizer for carts, but which is equally applicable for other vehicles; and my improvements consist, essentially, in the novel details of construction and general arrangement of parts, as will be hereinafter fully described, and pointed out in the claims.

Figure 1:
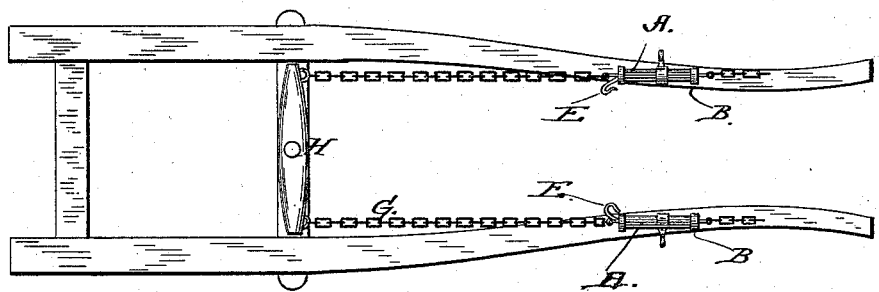
Figure 2:
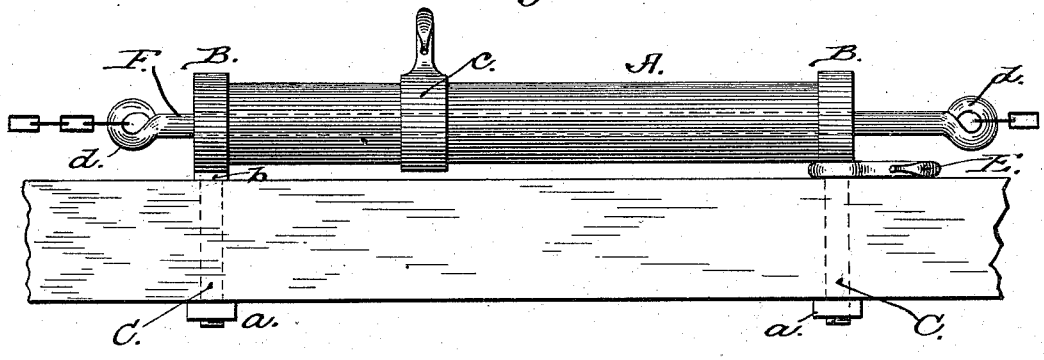

In the accompanying drawings, Figure 1 represents a top plan view of my improvements as applied to the shafts of a cart, and Fig. 2 a side elevation thereof.

Similar letters of reference indicate like parts in both figures of the drawings.

In carrying out my invention, in place of the usual rigid shaft-traveler I provide a hollow tube or pipe, A, which is preferably screw-threaded at each end for engagement with the correspondingly screw-threaded eyes B of the bolts C, whereby the parts are firmly secured together, the lower ends of the bolts C being adapted to pass through openings in the shafts D and secured in place beneath by the nuts $a$. Suitable shoulders, $b$, are provided on the said bolts C, which rest upon the upper surface of the shafts, so as to insure of a suitable space between the hollow tube or pipe A and the shaft D to permit the ready movement thereon back and forth of the sliding sleeve $c$ of the hook which engages with the chains of the harness-saddle, to hold the shafts up when the device is in operation. Upon the shoulder $b$ of the rear bolt C is hinged or pivoted a hook, E, for connection with the breeching of the harness.

Through the tube or pipe A passes a sliding rod, F, having loops $d$ at each end, the loop at the front end engaging with the chain of the collar of the harness, while the rear loop is connected to a rod or chain, G, which passes back to the end of the singletree H, one upon each side, as shown.

By means of my improved construction the draft-animal is relieved from the sudden jerks and strain common to working in carts, the strain being equalized by the sliding rods acting in connection with the singletree and the collar of the draft-animal.

The construction shown is exceedingly simple, its cost is small, and the parts may be easily and quickly connected with or disconnected from the harness when desired.

Having thus described my invention, I claim as new and desire to secure by Letters Patent—

1. In a draft-equalizer, the hollow tube or pipe A, screw-threaded at each end for attachment to the correspondingly screw-threaded eyes of the bolts C, and provided with the sliding sleeve-hooks $c$, and breeching-hook E, in combination with the sliding rod F and the traction appliances, substantially as and for the purpose specified.

2. In a draft-equalizer, the hollow tube or pipe A, secured to the eyes of the bolt C and provided with the sliding rod F, hook E, and sliding sleeve-hook $c$, in combination with the traction appliances, substantially in the manner and for the purpose specified.

3. In a draft-equalizer composed of a sliding rod connected to the collar of the harness and to the singletree, the hollow tube A, adapted to receive the said sliding rod and provided with a sliding sleeve-hook, $c$, and breeching-hook E, substantially as and for the purpose specified.

In testimony whereof I affix my signature in presence of two witnesses.

DANIEL H. RICKARD. [L. S.]

Witnesses:
  WM. W. DUNGAN,
  PARKER H. SWEET, Jr.